United States Patent [19]

Andrepont

[11] 4,091,897
[45] May 30, 1978

[54] HYDRAULIC COUNTERWEIGHT AND SHOCK-ABSORBING SYSTEM

[75] Inventor: John S. Andrepont, Lisle, Ill.

[73] Assignee: Chicago Bridge & Iron Company, Oak Brook, Ill.

[21] Appl. No.: 809,670

[22] Filed: Jun. 24, 1977

[51] Int. Cl.² .............................................. F16F 9/22
[52] U.S. Cl. .................................... 188/314; 188/303; 267/11 A
[58] Field of Search ............... 188/269, 297, 299, 300, 188/303, 314; 267/11 A, 12, 13

[56] References Cited

U.S. PATENT DOCUMENTS

| 2,997,146 | 3/1961 | Edwards et al. | 188/314 X |
| 3,277,791 | 10/1966 | Williams et al. | 188/314 X |

*Primary Examiner*—Duane A. Reger
*Attorney, Agent, or Firm*—Merriam, Marshall & Bicknell

[57] ABSTRACT

A hydraulic counterweight and shock-absorbing system for unbalanced loads comprises a hydraulic cylinder having a reciprocable piston attached to a rod which controls the position of the load. The hydraulic cylinder is filled with a hydraulic liquid and is provided with a valved by-pass conduit which is selectively operable to permit free movement of the piston in a "free-wheeling" mode. An accumulator partially filled with hydraulic liquid under a high-pressure gas phase is operatively connected to the rod end of the cylinder to provide a shock-absorbing function during a "hook-up" mode. In a "disconnect" mode, by-pass conduits provided with a check-valve and with a relief or pressure-controlled valve permit unimpeded upward movement of the load in response to an external applied force, but prevent downward movement of the load except on application of a force exceeding the weight of the load.

3 Claims, 2 Drawing Figures

HYDRAULIC COUNTERWEIGHT AND SHOCK-ABSORBING SYSTEM

This invention relates to a hydraulic counterweight and shock-absorbing system particularly useful in supporting one element of a "quick-disconnect" rigid mooring arm between a buoyant tower and a ship.

BACKGROUND OF THE INVENTION

In the operation of offshore oil wells it is common practice to employ a buoyant tower to which a ship or other vessel, such as a tanker or floating refinery, is moored. In such a system, it is desirable to employ a rigid interconnection between the vessel and the buoyant tower provided with "quick-disconnect" means for permitting the ship to be disconnected from the tower when the need arises. A typical quick-disconnect system comprises a first section which is permanently attached to the buoyant tower and which is adapted for rotation about vertical and horizontal axes, in order to permit the ship to rotate about the point of connection to the tower as well as to roll and pitch in response to the prevailing wind and water conditions. A second section of the quick-disconnect system is connected to the ship, usually as its bow, the two sections being designed to interlock and form a rigid connection between the ship and the tower.

During routine operation of the buoyant tower mooring, it is desired that the section of the mooring system attached to the buoyant tower offer no resistance to the free movement of the ship, the weight of the tower section of the mooring system being in effect supported by the ship through the rigid mooring arm structure. Some provision must be made, however, for supporting the weight of the tower section of the mooring system when no ship is attached thereto, and more particularly immediately after a ship is disconnected therefrom, in order to prevent the tower section of the mooring system from falling under its own considerable weight after the ship is disconnected, and thereby damaging either the tower or the system itself.

SUMMARY OF THE INVENTION

In accordance with the present invention, there is provided a hydraulic counterweight and a shock-absorbing system which is attached to the tower section of the mooring and which can be operated in any of three modes. For normal operation, i.e., with a ship attached to the tower, the assembly of the invention is in a "free-wheeling" mode which offers no substantial resistance to pitching movements of the ship. During a routine hook-up operation, the counterweight system is operated in a second mode, in which the system supports the tower section of the assembly at a desired elevation facilitating connection of the ship thereto. During such an operation, the counterweight system permits movement of the tower section above and below the desired rest point while acting as a shock-absorbing system to prevent damage to either the tower or the ship. During a quick-disconnect operation, the system of the invention operates in a third mode, in which it provides sufficient upward force to support the weight of the tower section of the mooring assembly, thus preventing it from falling under the influence of gravity and causing damage after the ship is disconnected. During such operation, however, if the ship applies a downward force of a predetermined magnitude to the tower section of the assembly, the system of the invention will permit the tower section to move downwardly so long as the force continues to be applied. At the same time, however, upward movement of the tower assembly is permitted with no substantial restraint. Accordingly, after the ship is disconnected, the system serves to prevent the tower section from falling, while during the disconnect operation, the system permits the tower section to move upwardly or downwardly to accommodate the movement of the ship.

Briefly described, the apparatus of the invention comprises a hydraulic cylinder having a reciprocable piston attached to a rod which controls the position of a load, e.g., a tower yoke. The hydraulic cylinder is filled with a hydraulic liquid and is provided with a valved by-pass conduit which is selectively operable to permit free movement of the piston in a "free-wheeling" mode. An accumulator partially filled with hydraulic liquid under a high-pressure gas phase is operatively connected to the rod end of the cylinder to provide a shock-absorbing function during a "hook-up" mode. In a "disconnect" mode, by-pass conduits provided with a check-valve and with a relief or pressure-controlled valve permit unimpeded upward movement of the load in response to an externally applied force, but prevent downward movement of the load except on application of a force exceeding the weight of the load.

BRIEF DESCRIPTION OF THE DRAWINGS

The invention will be better understood from the following detailed description thereof, taken in conjunction with the accompanying drawings, in which:

FIG. 1 shows the tower section of a ship quick-disconnect system consisting of a U-shaped yoke 10 attached to the top of a buoyant tower 11 by horizontal pins 12, about which the yoke can rotate. Attached to the outer extremity of yoke 10 is a female conical element 13 of a quick-disconnect mechanism which per se is not a part of the present invention. It will be understood that element 13 cooperates with a male element (not shown) attached to a ship or other vessel, not shown, through which a rigid interconnection is made to yoke 10. Further, it should be understood that although the present invention is described as applied to a ship-mooring system, it is not so restricted. The invention can in fact be used for any load for which it is desired to control the horizontal position of the load while providing free-wheeling and shock-absorbing capabilities.

Figure 1:
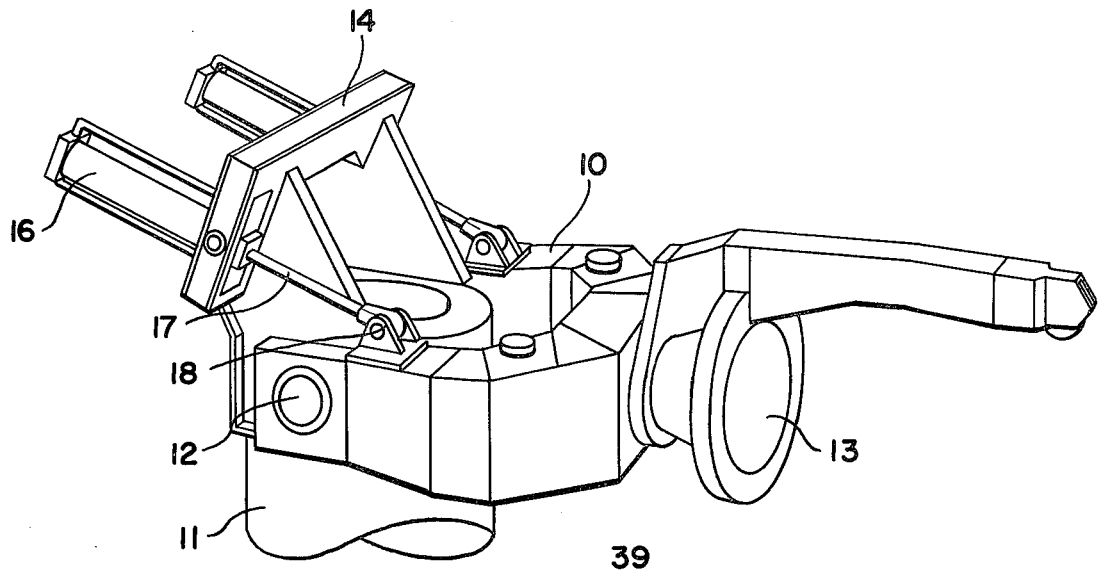
FIG. 1 is an isometric view of the tower section of a quick-disconnect system for attaching a ship to a buoyant tower, showing the system of the invention in place.

Attached to the upper end of tower 11 is a rigid frame 14 carrying a pair of hydraulic cylinders 16, each of which has a rod 17 extending therefrom, the end of which is attached by coupling 18 to the upper surface of yoke 10. In operation in a manner to be described, rods 17 reciprocate within cylinders 16 to control the elevation of yoke 10 and to support the weight thereof when a ship is not connected to the moving system.

The hydraulic counterweight and shock-absorbing system of the invention is intended to be used, and has capabilities for, three different modes of operation. In a hook-up mode, in which a ship is guided into proper position for attachment to element 13, the hydraulic system of the invention operates to position yoke 10 in an approximately horizontal elevation, while permitting variations above and below the set point to be permitted in response to movements of the ship prior to achievement of a rigid lock.

After the connection between yoke 10 and the ship has been effected, the system of the invention is operated in a free-wheeling mode, in which it does not restrict rotation of yoke 10 about pins 12, the unbalanced weight of the yoke being supported by the ship attached to tower 11.

During a quick-disconnect operation, in which the exact time of disengagement of the ship from the tower cannot be precisely known, the hydraulic system functions in a third mode to permit upward movement of yoke 10 with little or no restraint. Downward movement of the yoke, however, requires a total downward force which is greater than the unsupported weight of the yoke. Accordingly, during a quick-disconnect procedure, downward movement of the yoke is permitted as long as the ship is operatively attached to element 13 and exerts a downward force greater than a predetermined value. As soon as the ship is disconnected from the tower, however, the downward force exerted by the ship and the consequent downward movement of the yoke ceases, at which point the hydraulic system serves to prevent the yoke from falling under its own weight, preventing damage to the yoke or the tower to which it is attached.

Figure 2:
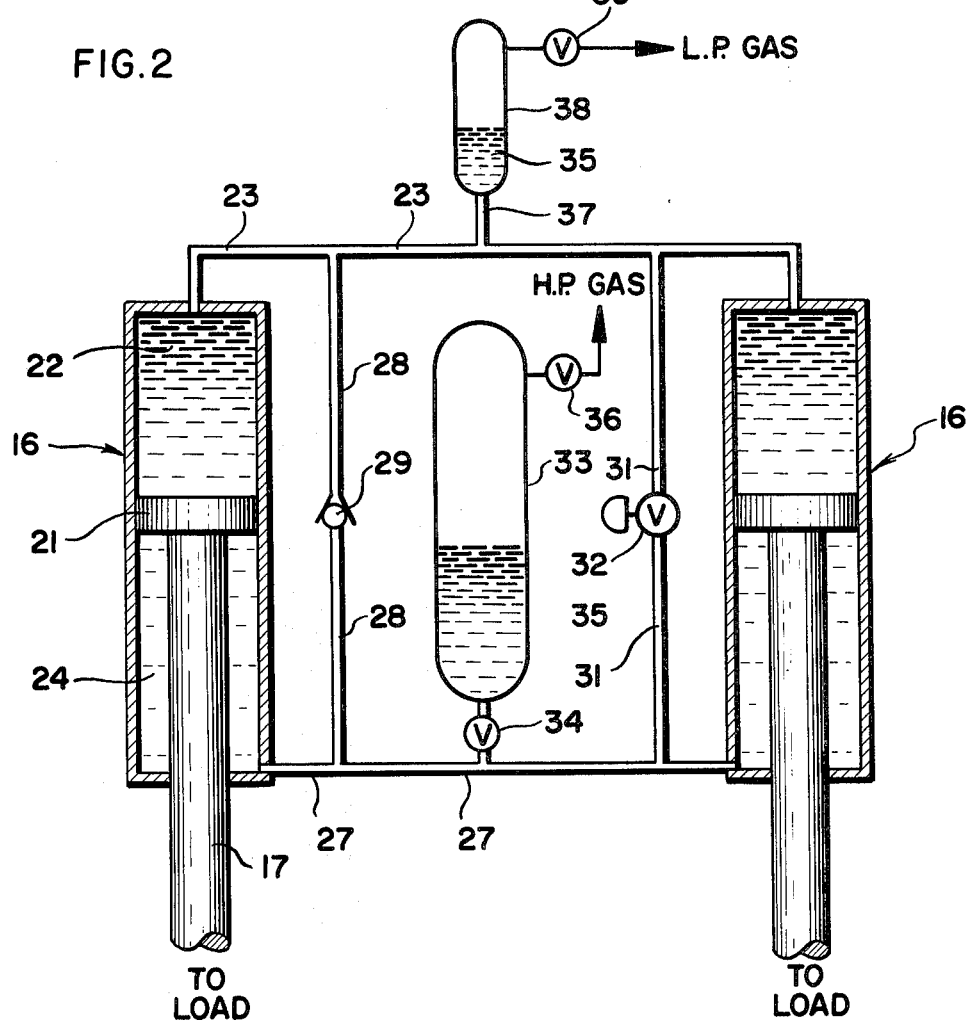
FIG. 2 is a schematic diagram showing the operating of the counterweight and shock absorbing system of the invention.

FIG. 2 illustrates schematically the construction and operation of a typical embodiment the hydraulic system of the invention, which in accordance with the representation shown in FIG. 1 incorporates two individual cylinders 16. It will be apparent to those skilled in the art, however, that the number of cylinders is immaterial and depends solely on requirements of a particular installation.

Each cylinder 16 has within it a reciprocable piston 21 which forms a fluid-tight seal therein and divides the cylinder into two sections, an upper or cap end 22 which is sealed except for conduit 23, and a lower or rod end 24 which is apertured to receive, in fluid-tight relationship, rod 17 attached to piston 21. The rod end 24 of cylinder 16 is thus effectively sealed except for conduit 27.

Interconnecting conduits 23 and 27 is conduit 28 which is provided with check valve 29 which permits fluid flow from conduit 23 to conduit 27 but prevents flow in the opposite direction.

Also interconnecting conduits 23 and 27 is conduit 31 provided with control valve 32 which can be selectively operated in either of two modes. In a first mode, valve 32 can be opened entirely to permit fluid flow in either direction therethrough. In a second mode, valve 32 is normally closed but opens to permit flow from conduit 27 to conduit 23 (but not in the reverse direction) whenever the pressure in conduit 27 exceeds a predetermined level.

Connected to conduit 27 is accumulator 33, comprising a high-pressure vessel connected through conventional valve 34 to conduit 27. The upper end of accumulator 33 is connected through valve 36 to a source of gas under high pressure.

Attached to conduit 23 through conduit 37 is a second accumulator 38, the upper end of which is attached through valve 39 to a source of gas at a substantially lower pressure than that supplied to accumulator 33. During operation of the system of the invention, both ends of cylinder 16, as well as conduits 23, 27, 28, and 31, are filled with a conventional hydraulic liquid 35. Accumulators 33 and 38 are also partially filled with the same liquid.

The operation of the system in each of its three modes will now be described.

During a routine hook-up operation, valve 34 is open, while control valve 32 and check valve 29 are normally closed. The high-pressure gas above liquid 35 in accumulator 33 transmits pressure through conduit 27 to rod end 24 of cylinder 16. The pressure in cap end 22 of cylinder 16, being established by the relatively low pressure of gas above the liquid in accumulator 38, is substantially less than that in rod end 24, a resulting net upward force on piston 21 is transmitted through rod 17 to yoke 10. By suitable adjustment of the volume of liquid in accumulator 33 and of the pressures of the gas phases in accumulators 33 and 38, rod 17 can be positioned to support yoke 10 at a desired elevation. When the desired elevation has been achieved, valves 36 and 39 are closed, trapping the gas phases within accumulators 33 and 38. The gas phases in each of the accumulators thereafter act as quick-acting springs which permit a limited movement of piston 21 up or down in cylinder 16 in response to movement of yoke 10 caused by contact with the ship during the hook-up operation. As piston 21 rises in response to an upward movement of the ship in contact with the yoke, the gas phase in accumulator 38 becomes increasingly compressed, thereby tending to progressively resist the upward motion, while the gas phase in cylinder 33 expands, thereby progressively decreasing the upward force which it supplies on piston 21. During downward movement of the piston the effects are reversed, the gas in accumulator 33 being compressed and increasingly resisting the downward movement, while the gas phase in accumulator 38 expands, reducing its pressure and thus the downward force on the upper surface of piston 21. In this manner, random upward and downward movements of the yoke are effectively snubbed without damage to the equipment.

During normal operation of the system of the invention, after a rigid connection between the ship and yoke 10 has been achieved, control valve 32 is opened to permit liquid flow in conduit 31 in both directions between conduits 23 and 27, and valve 34 is closed, effectively removing the pressure exerted by accumulator 33 on the hydraulic liquid in cylinder 16. In this mode, it will be seen that the by-pass connection through conduit 31 and valve 32 between cap end 22 and rod end 24 of cylinder 16 permits piston 21 to move upwardly or downwardly with little resistance. Because of the presence of rod 17 in the rod end of cylinder 16, however, the incremental change in volume of cap end 22 caused by a given movement of piston 21 is not equal to the incremental change in the volume of rod end 24. For example, the decrease in volume of cap end 22 caused by upward movement of piston 21 may be substantially greater than the increase in volume of rod end 24. The excess liquid displaced on such movement flows temporarily to accumulator 38, from which it is returned to cap end 22 on downward movement of the piston.

During a quick or emergency disconnect mode of operation, both of valves 34 and 32 are closed. The hydraulic liquid trapped beneath piston 21 prevents downward movement of rod 17 until the downward force exerted by the rod exceeds a predetermined value, greater than the unbalanced weight of yoke 10, whereupon valve 32 opens, permitting piston 21 to move downwardly in response to the force. On upward movement of piston 21, tending to compress the liquid in cap end 22, check valve 29 opens, thereby permitting the upward movement to occur with relatively little resistance. It will be seen, therefore, that during such a disconnect procedure, upward movement of yoke 10 by the ship is readily permitted, whereas downward movement requires a force greater than the weight of yoke 10 alone. Accordingly, as soon as the ship is effectively disconnected from the yoke so that it no longer exerts any force thereon, the weight of the yoke is supported, thereby preventing damage to any portion of the tower or the yoke itself.

The foregoing detailed description has been given for clearness of understanding only, and no unnecessary limitations should be understood therefrom, as modifications will be obvious to those skilled in the art.

What is claimed is:

1. A hydraulic counterweight and shock absorbing system comprising:
   a hollow cylinder having one closed end, the other end having an aperture adapted to receive a rod;
   a reciprocable piston within and forming a liquid tight seal with the interior of said cylinder;
   a rod having one end connected to said piston and passing through said other end of said cylinder in liquid-tight relationship with said aperture, the other end of said rod being adapted for connection to a load;
   a first accumulator comprising a pressure vessel adapted to contain a lower liquid phase comprising a hydraulic liquid and an upper phase comprising a compressed gas;
   first conduit means for flow of said hydraulic liquid between the lower end of said first accumulator and said apertured end of said cylinder;
   valve means in said first conduit means for controlling the flow of liquid therethrough;
   second conduit means for flow of said hydraulic fluid between said closed end and said apertured end of said cylinder;
   check valve means in said second conduit means for permitting flow of hydraulic fluid therein from said closed end to said apertured end of said cylinder but restricting flow in the opposite direction;
   third conduit means for flow of said hydraulic fluid between said closed end and said apertured end of said cylinder;
   control valve means in said third conduit means for controlling the flow of liquid therein, said control valve means being operable to open and closed positions, and being further adapted to open when in the closed position when the pressure in the apertured end of said cylinder exceeds a predetermined value.

2. A system in accordance with claim 1 which further includes a second accumulator comprising a second pressure vessel and fourth conduit means communicating from the lower end of said second pressure vessel to the closed end of said cylinder.

3. The system of claim 1 wherein said accumulators are operatively connected to sources of gas under elevated pressure, the pressure supplied to said first accumulator being greater than that supplied to said second accumulator.

* * * * *